(12) United States Patent
King et al.

(10) Patent No.: US 7,995,114 B2
(45) Date of Patent: Aug. 9, 2011

(54) METHOD FOR PROVIDING IMAGE ILLUMINATION CALIBRATION FOR AN IMAGING APPARATUS

(75) Inventors: Anthony Michael King, Lexington, KY (US); Mark Eric Miller, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 908 days.

(21) Appl. No.: 11/954,754

(22) Filed: Dec. 12, 2007

(65) Prior Publication Data

US 2009/0153697 A1    Jun. 18, 2009

(51) Int. Cl.
*H04N 5/235* (2006.01)
*H01L 27/00* (2006.01)
*H01L 1/42* (2006.01)
(52) U.S. Cl. ............... 348/229.1; 250/208.1; 250/208.3
(58) Field of Classification Search ............... 348/229.1; 250/208.1, 208.3
See application file for complete search history.

(56) References Cited

U.S. PATENT DOCUMENTS

| | | | |
|---|---|---|---|
| 7,259,784 B2 * | 8/2007 | Cutler | 348/223.1 |
| 2006/0256214 A1 * | 11/2006 | MacLean et al. | 348/234 |
| 2007/0030537 A1 * | 2/2007 | Mai et al. | 358/509 |

* cited by examiner

*Primary Examiner* — Sinh Tran
*Assistant Examiner* — Quang V Le

(57) ABSTRACT

A method for providing image illumination calibration includes: generating a plurality of images of a calibration target at a plurality of exposure levels, each image of the plurality of images being represented by a total pixel area; identifying a plurality of zones of the total pixel area, each zone of the plurality of zones corresponding to a particular image of the plurality of images at a particular exposure level of the plurality of exposure levels, with each zone representing a pixel sub-area that excludes saturated pixels; combining the plurality of zones for the plurality of images of the calibration target to generate a final calibration image; and generating a shading table to correct the final calibration image to obtain a uniform image of the calibration target over the total pixel area, the shading table including gain and offset values associated with each pixel of the total pixel area.

12 Claims, 7 Drawing Sheets

US 7,995,114 B2

METHOD FOR PROVIDING IMAGE ILLUMINATION CALIBRATION FOR AN IMAGING APPARATUS

CROSS-REFERENCE TO RELATED APPLICATIONS

None.

MICROFICHE APPENDIX

None.

GOVERNMENT RIGHTS IN PATENT

None.

BACKGROUND OF THE INVENTION

1. Field of the Invention

The present invention relates to imaging, and, more particularly, to a method for providing image illumination calibration for an imaging apparatus.

2. Description of the Related Art

The illumination subsystem is a key factor in the dynamic range and contrast of the image being captured for a camera scan system. FIG. 1 illustrates an uncalibrated image 10 of a white sheet of media, wherein region 12 illustrates illumination from a single point light source. Region 12 represents a ten percent saturation of the total image area, with lens vignetting occurring in regions 14, 16, 18 and 20. Lens vignetting is a reduction in image brightness in the image periphery compared to the image interior.

An ideal camera scan system would include a very uniform distribution of light over the entire area to be captured. In reality, a perfectly uniform light source cannot cost effectively be designed or produced. In traditional scanner systems, the non-uniform light distribution is calibrated out using a method of gains and offsets called shading correction. The function of shading correction is to apply a unique gain to each pixel value so that the resulting image appears to be uniformly illuminated. In essence, the darker pixels are "gained" up to have the same value as the lighter pixels. The lower the uniformity, the higher the gain value needed. As gain values go up, the dynamic range of the system goes down and results in a reduction of gray levels that can be distinguished.

For a full image capture system (e.g., an 8.5 inch by 11 inch image) using an array sensor, the area is larger and harder to uniformly illuminate, especially in a small space. Using multiple light sources improves uniformity, but adds significant cost. Also, the lens reduction required for a full image scan detracts from uniformity due to the vignetting of the lens.

SUMMARY OF THE INVENTION

The present invention provides virtual uniform illumination of a calibration target to provide full image illumination calibration for an imaging apparatus.

The invention, in one form thereof, is directed to a method for providing image illumination calibration for an imaging apparatus having a camera scan system. The method includes: generating a plurality of images of a calibration target at a plurality of exposure levels, each image of the plurality of images being represented by a total pixel area; identifying a plurality of zones of the total pixel area, each zone of the plurality of zones corresponding to a particular image of the plurality of images at a particular exposure level of the plurality of exposure levels, with each zone of the plurality of zones representing a pixel sub-area of the total pixel area that excludes saturated pixels; combining the plurality of zones for the plurality of images of the calibration target to generate a final calibration image; and generating a shading table that results in shading correction for the final calibration image to obtain a uniform image of the calibration target over the total pixel area, the shading table including gain and offset values associated with each pixel of the total pixel area.

The invention, in another form thereof, is directed to a method for providing image illumination calibration for an imaging apparatus having a camera scan system. The method includes: (a) setting an exposure level of an illumination source of the camera scan system to a first exposure level; (b) generating a first image of the calibration target at the first exposure level having a first percentage of saturated pixels that defines a first zone in a total pixel area corresponding to the first image, the first zone representing a pixel sub-area of the total pixel area that excludes saturated pixels; (c) setting the exposure level of the illumination source of the camera scan system to a next exposure level; (d) generating a next image of the calibration target at the next exposure level having a next percentage of saturated pixels that defines a next zone in the total pixel area corresponding to the next image, the next zone representing a pixel sub-area of the total pixel area that excludes saturated pixels; (e) repeating acts (c) and (d) a predetermined number of times to generate a plurality of images of the calibration target and a corresponding plurality of zones; (f) combining the plurality of zones for the plurality of images of the calibration target to generate a final calibration image; and (g) generating a shading table that results in shading correction for the final calibration image to obtain a uniform image of the calibration target over the total pixel area, the shading table including gain and offset values associated with each pixel of the total pixel area.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention, in one form, and such exemplifications are not to be construed as limiting the scope of the invention in any manner.

DETAILED DESCRIPTION OF THE INVENTION

Figure 1:
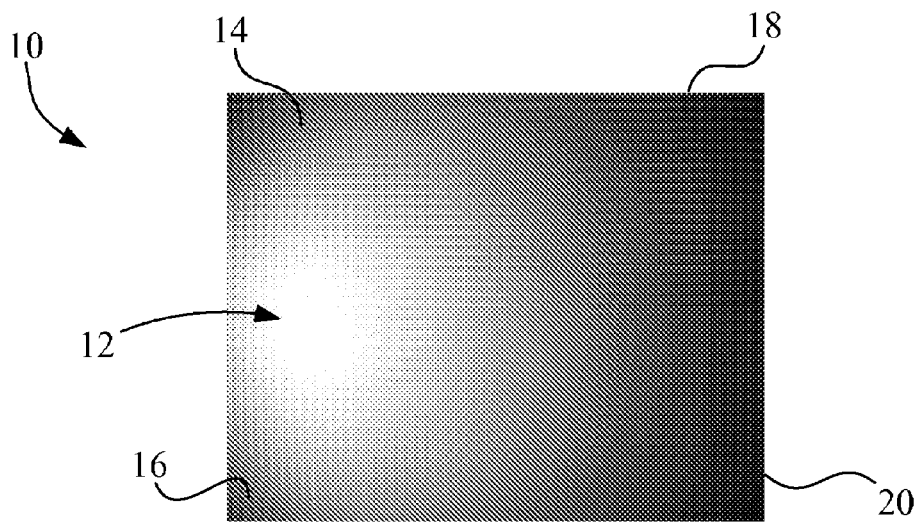
FIG. 1 illustrates an uncalibrated image of a white sheet.
Figure 2:
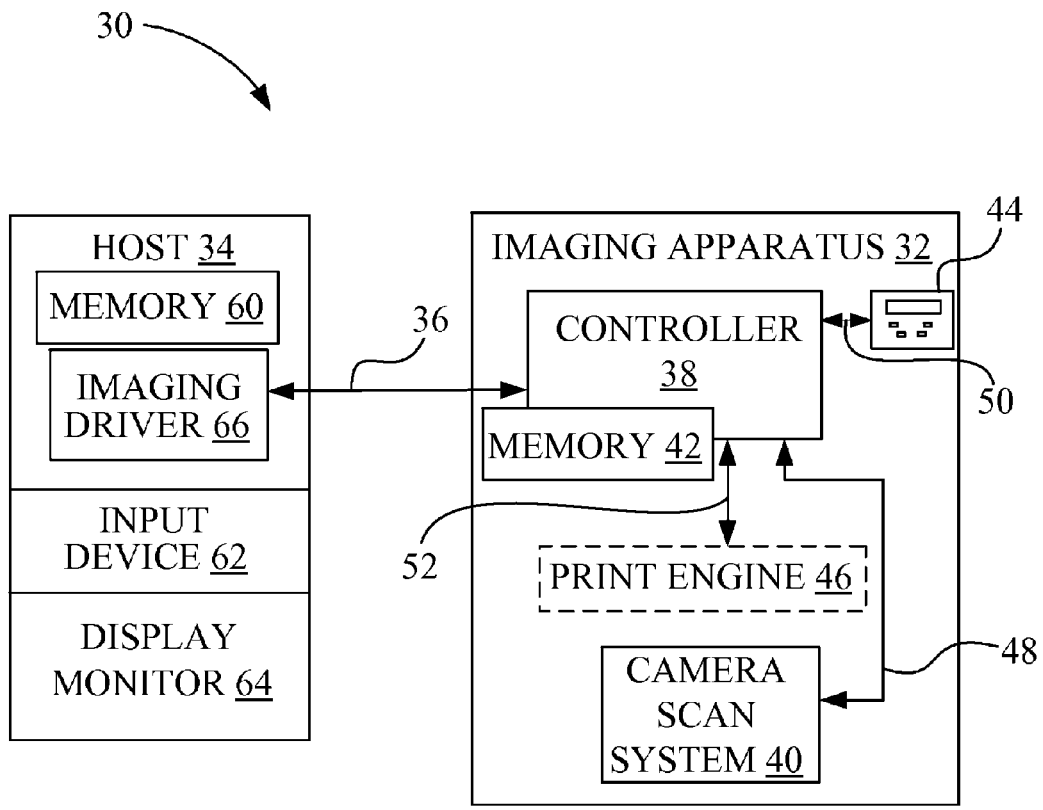
FIG. 2 is a diagrammatic depiction of an imaging system embodying the present invention.

Referring now to the drawings and particularly to FIG. 2, there is shown a diagrammatic depiction of an imaging system 30 embodying the present invention.

Imaging system 30 may include an imaging apparatus 32 and a host 34. Imaging apparatus 32 communicates with host 34 via a communications link 36. As used herein, the term "communications link" is used to generally refer to structure that facilitates electronic communication between multiple components, and may operate using wired or wireless technology. Imaging apparatus 32 may communicate with host 34 via a standard communication protocol, such as for example, universal serial bus (USB), Ethernet or IEEE 802.xx.

In the exemplary embodiment of FIG. 2, imaging apparatus 32 includes a controller 38, a camera scan system 40, memory 42, and a user interface 44. Optionally, as indicated by dashed lines, imaging apparatus 32 may also include a print engine 46 for performing a printing function. Print engine 46 may accommodate, for example, ink jet printing, electrophotographic printing, thermal transfer printing, etc. Thus, in the context of the present invention, it is to be understood that imaging apparatus 32 may be a scanner, a scanner-copier, a scanner-printer-copier, and may include other functionality, such as facsimile capability to form an All-In-One (AIO) machine.

Controller 38 includes a processor unit and associated memory 42, and may be formed as one or more Application Specific Integrated Circuits (ASIC). Memory 42 may be, for example, random access memory (RAM), read only memory (ROM), and/or non-volatile RAM (NVRAM). Alternatively, memory 42 may be in the form of a separate electronic memory (e.g., RAM, ROM, and/or NVRAM), a hard drive, a CD or DVD drive, or any memory device convenient for use with controller 38. Controller 38 is a scanner controller, and in some embodiments may be a combined printer and scanner controller.

In the present embodiment, controller 38 communicates with camera scan system 40 via a communications link 48. User interface 44 is communicatively coupled to controller 38 via a communications link 50. Optional print engine 46 is communicatively coupled to controller 38 via a communications link 52. Controller 38 serves to operate camera scan system 40 and process data obtained via camera scan system 40. In addition, optionally, controller 38 executes program instructions to process print data and to operate print engine 46 during printing.

Host 34, which may be optional, may be, for example, a personal computer, including memory 60, such as RAM, ROM, and/or NVRAM, an input device 62, such as a keyboard, and a display monitor 64. Host 34 further includes a processor, input/output (I/O) interfaces, and at least one mass data storage device, such as a hard drive, a CD-ROM and/or a DVD unit.

Host 34 may include in its memory a software program including program instructions that function as an imaging driver 66, e.g., scanner and/or printer driver software, for imaging apparatus 32. Imaging driver 66 is in communication with controller 38 of imaging apparatus 32 via communications link 36. Imaging driver 66 facilitates communication between imaging apparatus 32 and host 34.

In some circumstances, it may be desirable to operate imaging apparatus 32 in a standalone mode. In the standalone mode, imaging apparatus 32 is capable of functioning without host 34. Accordingly, all or a portion of imaging driver 66, or a similar driver, may be located in controller 38 of imaging apparatus 32 so as to accommodate scanning, copying, and/or printing operations being handled by imaging apparatus 32 when operating in the standalone mode.

Figure 3:
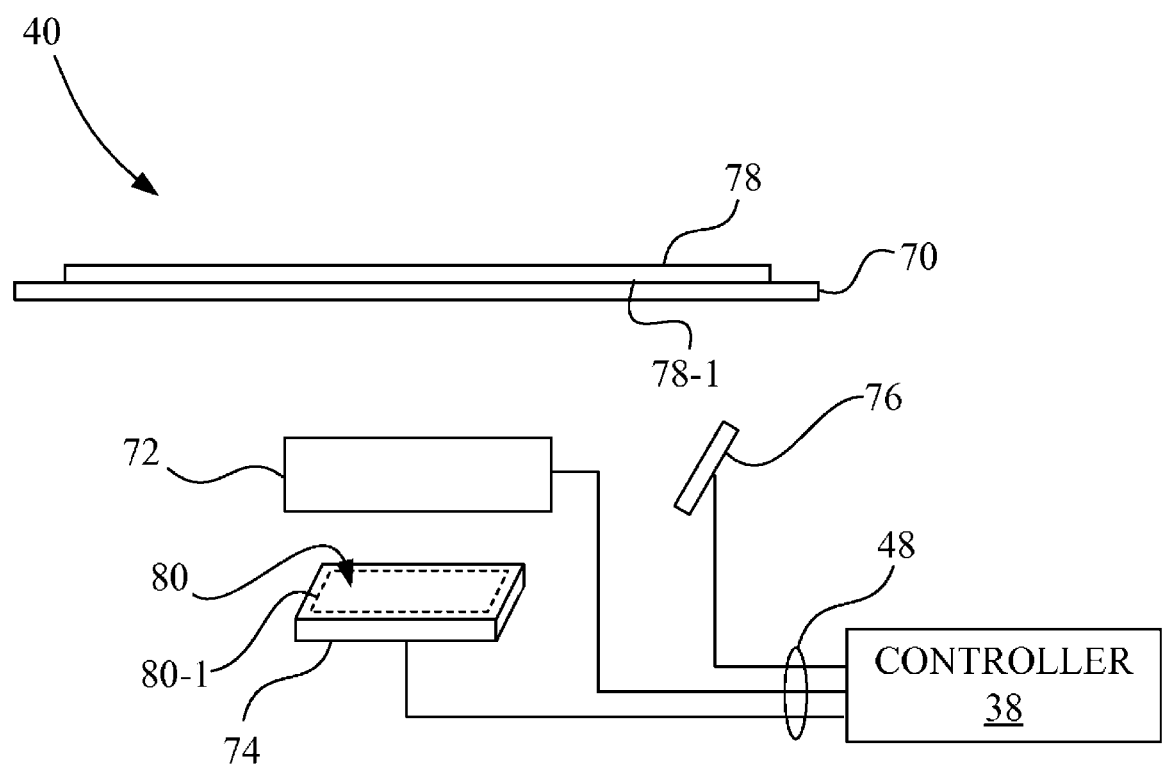
FIG. 3 is a diagrammatic representation of a camera scan system in the imaging apparatus of the imaging system of FIG. 2.

Referring to FIG. 3, there is shown a diagrammatic representation of an embodiment of camera scan system 40. Camera scan system 40 includes a document support 70, a lens system 72, a sensor array 74 and an illumination source 76. Document support 70 is a transparent member, e.g., glass, for supporting a target 78, e.g., a calibration sheet, document, etc., to be scanned. Lens system 72, sensor array 74 and illumination source 76 are communicatively coupled to controller 38 via communication link 48. As used herein, the term "illumination source" means one or more light sources that provide illumination.

A surface 78-1 of target 78 to be scanned is positioned to face lens system 72 and illumination source 76. Where target 78 is a calibration sheet, surface 78-1 may be a flat white material. Controller 38 operates lens system 72 to provide auto focusing, and image enlargement/reduction. Controller 38 operates illumination source 76 to illuminate surface 78-1 of target 78, and receives image data representing surface 78-1 of target 78 from sensor array 74.

Sensor array 74 includes a plurality of sensor elements arranged in a two-dimensional array, with each sensor element being referred to herein as a pixel and said plurality of sensor elements being referred to herein as a pixel area 80. The term "total pixel area" is all or a portion of pixel area 80 used in representing a full image, e.g., an image of target 78. Accordingly, the total pixel area will be referenced as total pixel area 80-1.

Figure 4A:
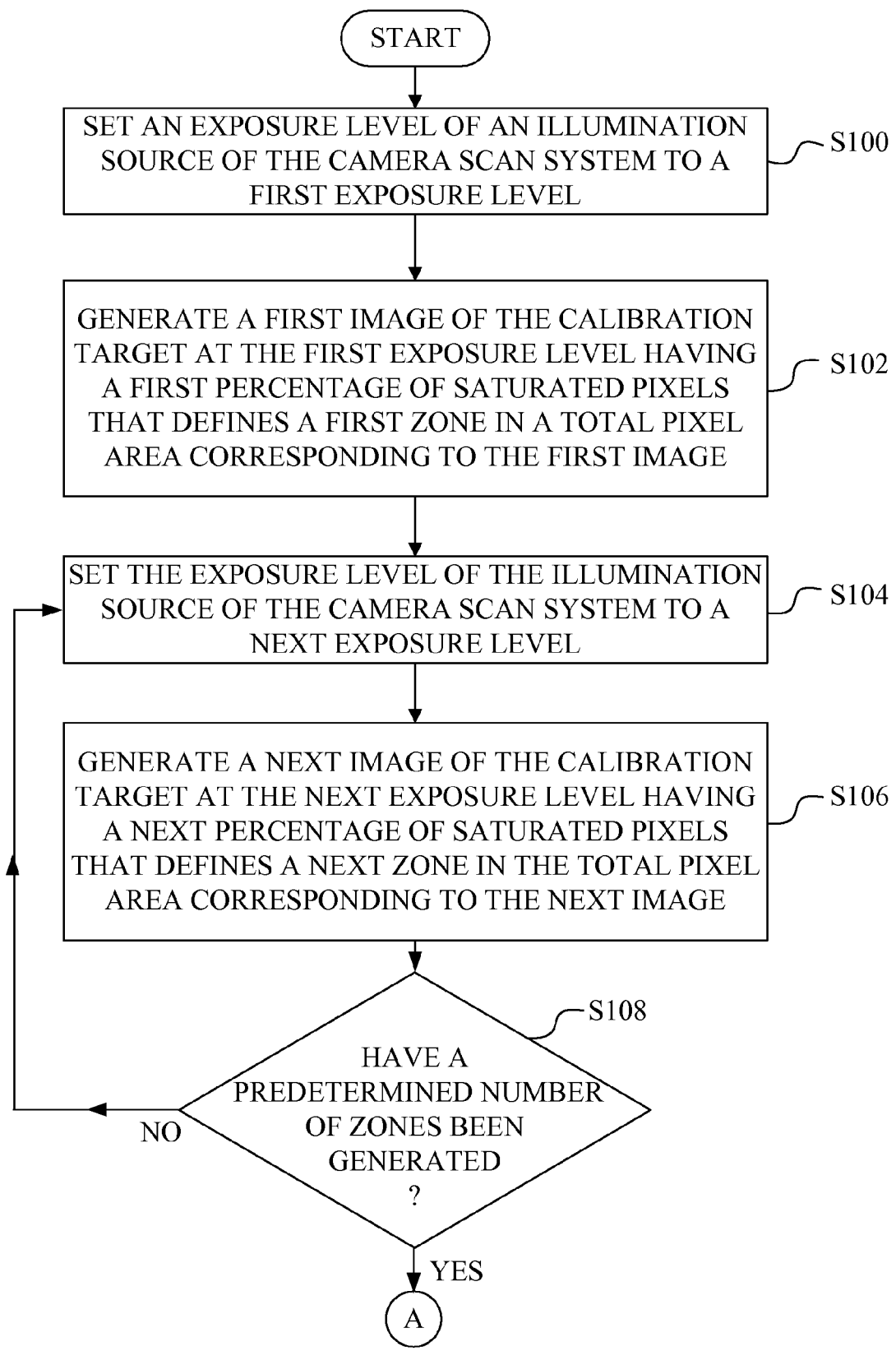
FIGS. 4A and 4B is a flowchart of a method for providing image illumination calibration in the imaging apparatus having the camera scan system of the imaging system of FIG. 1.
Figure 4B:
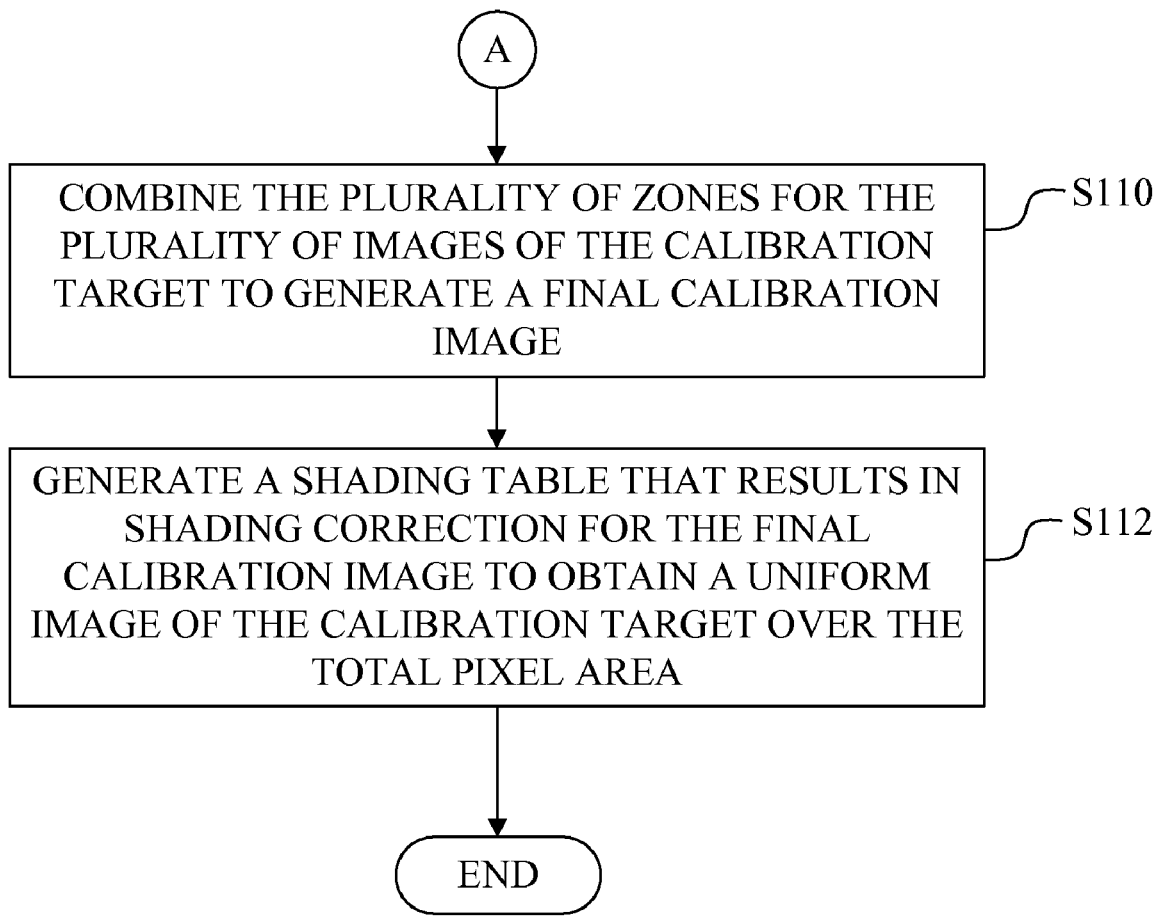

FIGS. 4A and 4B form a flowchart of a method for providing image illumination calibration of camera scan system 40, in accordance with an embodiment of the present invention.

At act S100, an exposure level of illumination source 76 of the camera scan system 40 is set to a first exposure level.

The first exposure level may be a highest exposure level to be used, e.g., resulting in a high saturation, e.g., 90 percent saturation of total pixel area 80-1.

Figure 5A:
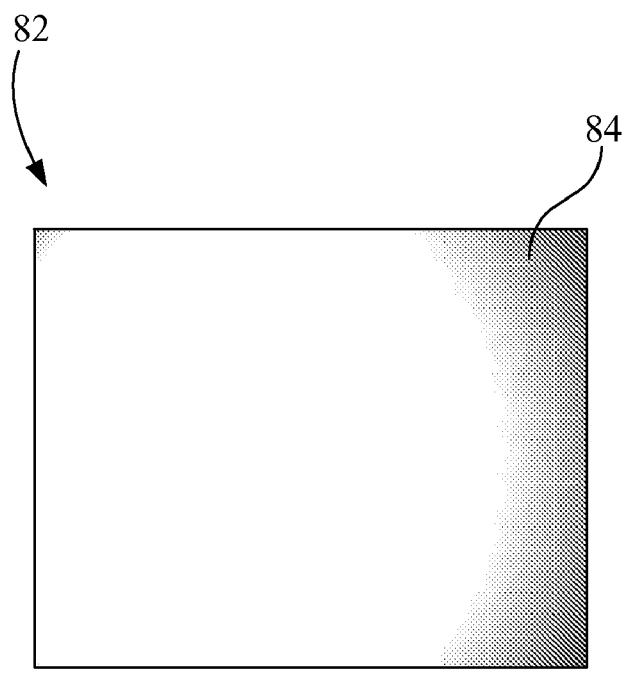
FIG. 5A is a diagrammatic representation of an image of a calibration target generated at a first exposure level and having a first percentage of saturated pixels that defines a first zone.

At act S102, a first image, e.g., image 82 of FIG. 5A, of the calibration target 78 is generated at the first exposure level having a first percentage of saturated pixels that defines a first zone 84 in total pixel area 80-1 corresponding to the first image 82. The first zone 84 is shown in FIG. 5A as the non-white area of image 82, and represents a pixel sub-area of total pixel area 80-1 that excludes saturated pixels. The pixel sub-area consists of pixels having a pixel value less than a predetermined threshold. The predetermined threshold may be, for example, 240 decimal in a range of zero to 255 decimal, with a saturated pixel being a pixel having a pixel value of 240 or greater.

At act S104, the exposure level of the illumination source 76 of the camera scan system 40 is set to a next exposure level. The present next exposure level may be, for example, reduced from the first exposure level of acts S100 and S102. It is contemplated that the present invention may be practiced by varying illumination intensity, wherein the exposure level (in terms of pixel value) equals the illumination intensity multiplied by the exposure time (in lux-seconds). In other words, the illumination intensity of illumination source 76 of may be reduced to provide the next exposure level at an exposure level less than the previous exposure level. An alternate method is to keep intensity the same and reduce exposure time.

Figure 5B:
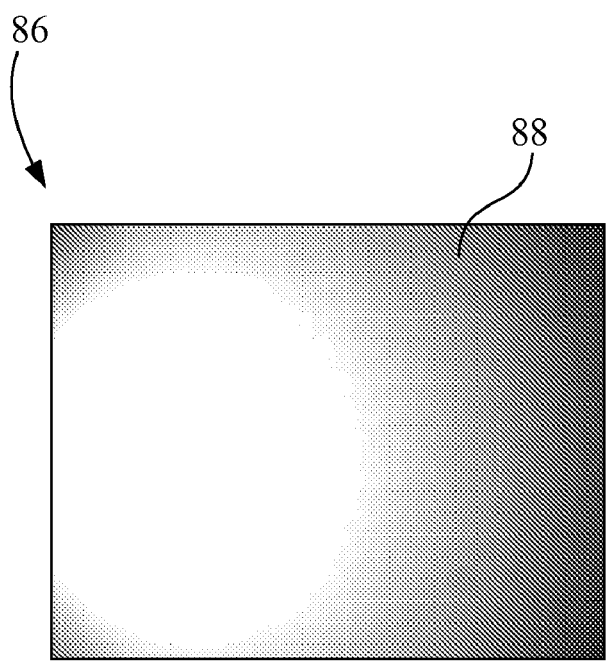
FIG. 5B is a diagrammatic representation of another image of the calibration target generated at a next exposure level and having a next percentage of saturated pixels that defines a next zone.

At act S106, a next image, e.g., image 86 of FIG. 5B, of the calibration target 78 is generated at the next exposure level of act S104 having a next percentage of saturated pixels (e.g., 50 percent) that defines a next zone 88 in the total pixel area 80-1 corresponding to the next image 86. The zone 88 is shown in FIG. 5B as the non-white area of image 86, and represents a pixel sub-area of the total pixel area 80-1 that excludes saturated pixels. As set forth above, the pixel sub-area consists of pixels having a pixel value less than a predetermined threshold.

At act S108, it is determined whether a predetermined number of zones have been generated. In other words, acts S104 and S106 are repeated a predetermined number of times to generate a plurality of images of the calibration target 78 and a corresponding plurality of zones. The number of times may be limited, for example, based on the size of total pixel area 80-1. The final exposure will have an insignificant amount of saturated pixels, i.e., less than one percent.

Figure 5C:
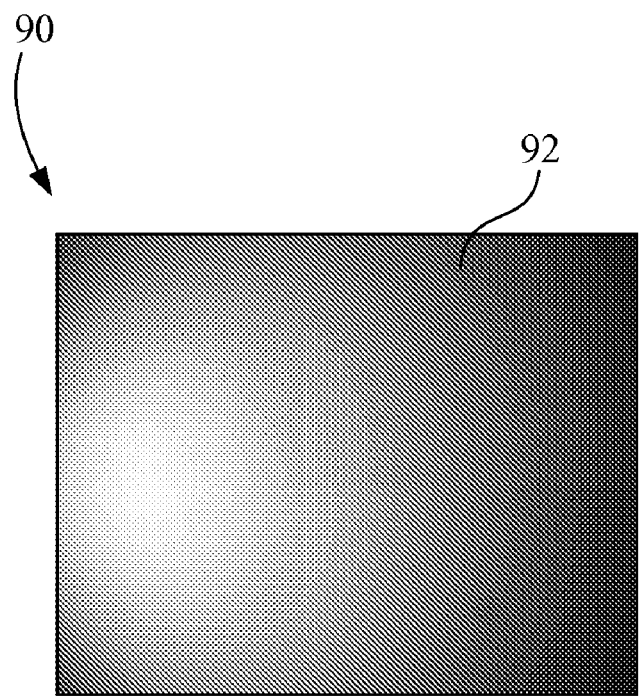
FIG. 5C is a diagrammatic representation of another image of the calibration target generated at a further next exposure level and having further next percentage of saturated pixels that defines a further next zone.

For example, acts S104 and S106 may be repeated to generate a next image, e.g., image 90 of FIG. 5C, of the calibration target 78 at the next exposure level having a next percentage of saturated pixels (e.g., one percent) that defines a next zone 92 in the total pixel area 80-1 corresponding to image 90. The zone 92 is shown in FIG. 5C as the non-white area of image 90, and represents a pixel sub-area of the total pixel area 80-1 that excludes saturated pixels.

The definitions of the plurality of zones, e.g., zones 84, 88 and 92, may be saved to a memory map of the total pixel area 80-1, wherein the memory map may be indexed by exposure level. The memory map may be established, for example, in memory 42 of imaging apparatus 32.

Figure 5D:
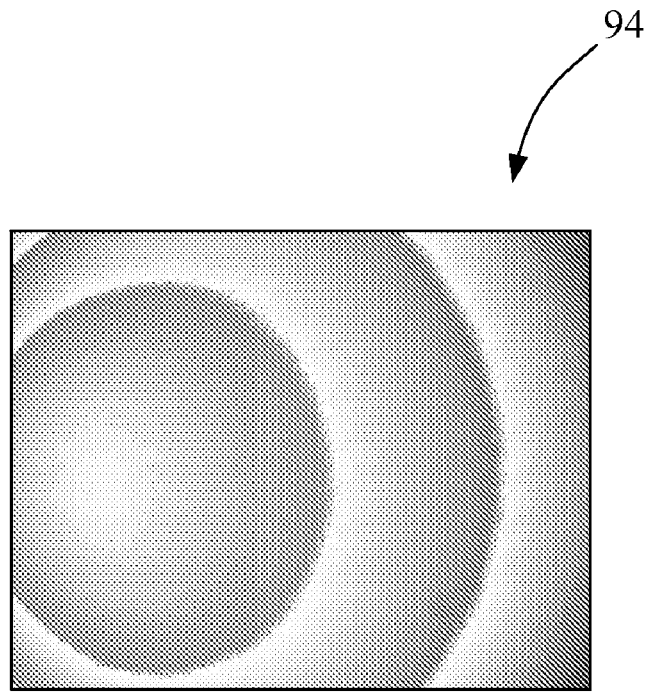
FIG. 5D is a diagrammatic representation of a final calibration image resulting from the combination of the plurality of zones of FIGS. 5A, 5B and 5C.

At act S110, the plurality of zones for the plurality of images of the calibration target 78 are combined to generate a final calibration image 94, as illustrate in FIG. 5D. For example, the final calibration image may be generated by exclusively adding the plurality of zones, e.g., by the equation:

$$I=Z1+(Z2-Z1)+(Z3-Z2)+ \ldots (Zn-Z(n-1)),$$

wherein: I is the final calibration image, and Z1, Z2, Z3 . . . Zn are individual zones of the plurality of zones.

In other words, the properly exposed portions of each image (i.e., the zones) are pieced together. The resulting final calibration image requires less gain adjustment and has the effect of extending the dynamic range of the system and reducing random noise over that of the prior systems that do not implement the present method. For example, random noise increases linearly with gain just as intensity. Accordingly, if for example the mean gain per pixel is 2.0, then the random noise will be twice the level it would be for a uniformly illuminated image.

At act S112, a shading table is generated that results in shading correction for the final calibration image 94 to obtain a uniform image of the calibration target 78 over the total pixel area 80-1. The shading table includes gain and offset values associated with each pixel of the total pixel area 80-1. The shading table may be stored, for example, in memory 42.

Figure 6:
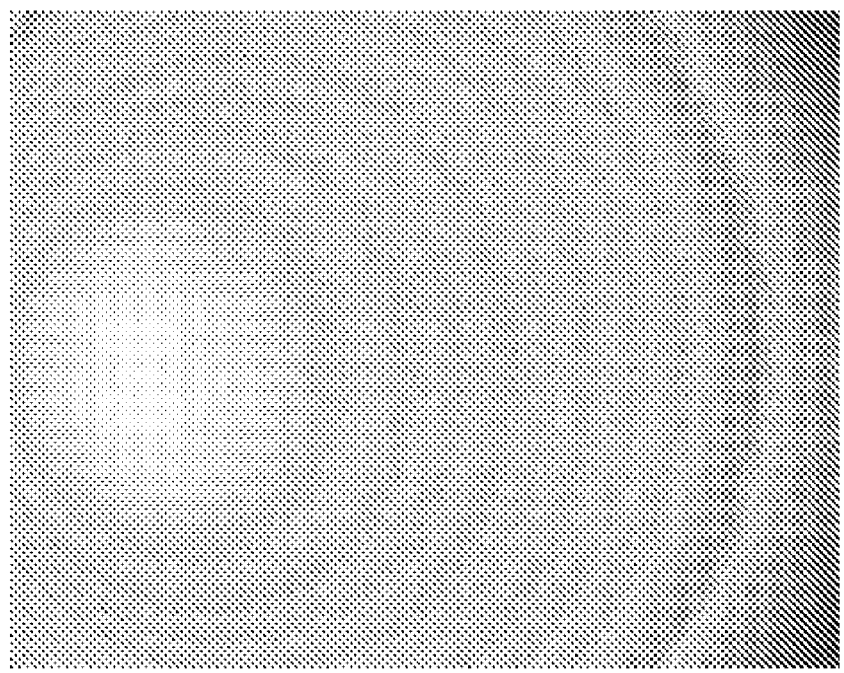
FIG. 6 is another example of a final calibration image resulting from the combination of ten zones.

FIG. 6 is another example of a final calibration image 96 resulting from the combination of ten zones, e.g., zones Z1, Z2, Z3, . . . Z10, which appear essentially as orbs around a brighter object portion. After application of an associated shading table, however, a uniform image of the calibration target 78 over the total pixel area 80-1 is generated.

During the scanning of a document, the shading table and memory map of zones are applied in association with multiple exposures of the document being scanned to generate an image of the document. In other words, the document to be scanned is scanned at multiple exposure levels, with each exposure level being used to index the memory map to select a corresponding zone of the total pixel area 80-1 to be used in conjunction with the shading table in generating an image of the document.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for providing image illumination calibration for an imaging apparatus having a camera scan system, comprising:
   generating a plurality of images of a calibration target at a plurality of exposure levels, each image of said plurality of images being represented by a total pixel area;
   identifying a plurality of zones of said total pixel area, each zone of said plurality of zones corresponding to a particular image of said plurality of images at a particular exposure level of said plurality of exposure levels, with each zone of said plurality of zones representing a pixel sub-area of said total pixel area that excludes saturated pixels;
   combining said plurality of zones for said plurality of images of said calibration target to generate a final calibration image; and
   generating a shading table that results in shading correction for said final calibration image to obtain a uniform image of said calibration target over said total pixel area, said shading table including gain and offset values associated with each pixel of said total pixel area.

2. The method of claim 1, wherein said pixel sub-area consists of pixels having a pixel value less than a predetermined threshold.

3. The method of claim 2, wherein said predetermined threshold is 240 decimal in a range of zero to 255 decimal, with a saturated pixel being a pixel having a pixel value of 240 or greater.

4. The method of claim 1, further comprising saving definitions of said plurality of zones to a memory map of said total pixel area, said memory map being indexed by exposure level.

5. The method of claim 4, wherein a document to be scanned is scanned at multiple exposure levels, each exposure level being used to index said memory map to select a corresponding zone of said total pixel area to be used in conjunction with said shading table in generating an image of said document.

6. The method of claim 4, further comprising applying said shading table and said memory map in association with multiple exposures of a document being scanned to generate an image of said document.

7. A method for providing image illumination calibration for an imaging apparatus having a camera scan system, comprising:

(a) setting an exposure level of an illumination source of said camera scan system to a first exposure level;
(b) generating a first image of said calibration target at said first exposure level having a first percentage of saturated pixels that defines a first zone in a total pixel area corresponding to said first image, said first zone representing a pixel sub-area of said total pixel area that excludes saturated pixels;
(c) setting said exposure level of said illumination source of said camera scan system to a next exposure level;
(d) generating a next image of said calibration target at said next exposure level having a next percentage of saturated pixels that defines a next zone in said total pixel area corresponding to said next image, said next zone representing a pixel sub-area of said total pixel area that excludes saturated pixels;
(e) repeating acts (c) and (d) a predetermined number of times to generate a plurality of images of said calibration target and a corresponding plurality of zones;
(f) combining said plurality of zones for said plurality of images of said calibration target to generate a final calibration image; and
(g) generating a shading table that results in shading correction for said final calibration image to obtain a uniform image of said calibration target over said total pixel area, said shading table including gain and offset values associated with each pixel of said total pixel area.

8. The method of claim 7, wherein said pixel sub-area consists of pixels having a pixel value less than a predetermined threshold.

9. The method of claim 8, wherein said predetermined threshold is 240 decimal in a range of zero to 255 decimal, with a saturated pixel being a pixel having a pixel value of 240 or greater.

10. The method of claim 7, further comprising saving definitions of said plurality of zones to a memory map of said total pixel area, said memory map being indexed by exposure level.

11. The method of claim 10, wherein a document to be scanned is scanned at multiple exposure levels, each exposure level being used to index said memory map to select a corresponding zone of said total pixel area to be used in conjunction with said shading table in generating an image of said document.

12. The method of claim 10, further comprising applying said shading table and said memory map in association with multiple exposures of a document being scanned to generate an image of said document.

* * * * *